United States Patent [19]
Golden et al.

[11] Patent Number: 5,919,286
[45] Date of Patent: *Jul. 6, 1999

[54] PSA PROCESS FOR REMOVEL OF NITROGEN OXIDES FROM GAS

[75] Inventors: Timothy Christopher Golden; Fred William Taylor, both of Allentown, Pa.; Mohammed Ali Kalbassi, Walton-on-Thames, United Kingdom; William Paul Schmidt, Wescosville, Pa.

[73] Assignee: Air Products and Chemicals, Inc., Allentown, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/811,805

[22] Filed: Mar. 6, 1997

[51] Int. Cl.⁶ .................................................. B01D 53/047
[52] U.S. Cl. ................... 95/98; 95/105; 95/122; 95/128; 95/129; 95/139
[58] Field of Search ................... 95/98, 99, 105, 95/117, 122, 128, 129

[56] References Cited

U.S. PATENT DOCUMENTS

| | | | |
|---|---|---|---|
| 2,944,627 | 7/1960 | Skarstrom | 183/4.7 |
| 3,015,369 | 1/1962 | Brennan | 95/129 |
| 3,674,429 | 7/1972 | Collins | 95/122 X |
| 3,689,212 | 9/1972 | Petit et al. | 95/128 X |
| 4,153,429 | 5/1979 | Matthews et al. | 95/129 X |
| 4,183,728 | 1/1980 | Leitzke et al. | 95/129 X |
| 4,249,915 | 2/1981 | Sircar et al. | 55/26 |
| 4,326,858 | 4/1982 | Benkmann | 95/122 X |
| 4,533,365 | 8/1985 | Ringel | 95/129 X |
| 4,711,645 | 12/1987 | Kumar | 55/26 |
| 5,156,657 | 10/1992 | Jain et al. | 95/122 X |
| 5,221,520 | 6/1993 | Cornwell | 95/117 X |
| 5,232,474 | 8/1993 | Jain | 55/26 |
| 5,417,950 | 5/1995 | Sheu et al. | 95/129 X |
| 5,447,558 | 9/1995 | Acharya | 95/122 X |
| 5,514,204 | 5/1996 | Sheu et al. | 95/129 X |
| 5,560,763 | 10/1996 | Kumar | 95/98 |
| 5,624,477 | 4/1997 | Armond | 95/117 X |
| 5,656,065 | 8/1997 | Kalbassi et al. | 95/122 X |
| 5,670,125 | 9/1997 | Sheu et al. | 95/129 X |

FOREIGN PATENT DOCUMENTS

| | | | |
|---|---|---|---|
| 0449576 | 3/1991 | European Pat. Off. . | |
| 06125584 | 8/1994 | European Pat. Off. | 95/117 |
| 3045451 | 2/1981 | Germany . | |
| 3244370 | 6/1984 | Germany | 95/129 |
| 3702190 | 1/1987 | Germany . | |
| 49-095883 | 9/1974 | Japan | 95/129 |
| 54-103777 | 8/1979 | Japan | 95/122 |
| 59-040300 | 3/1984 | Japan | 95/129 |
| 1586961 | 8/1976 | United Kingdom . | |

*Primary Examiner*—Robert Spitzer
*Attorney, Agent, or Firm*—Geoffrey L. Chase

[57] ABSTRACT

A process for removing nitrogen oxides, as well as water and carbon dioxide, from gas streams containing at least 0.2 ppm by volume of nitrogen oxides by passing the gas stream through an alumina adsorbent and a zeolite adsorbent, preferably 13X-zeolite. The process has utility in front end cleanup of air prior to cryogenic distillation of the air where nitrogen oxides would otherwise freeze under the cryogenic processing.

8 Claims, No Drawings

PSA PROCESS FOR REMOVEL OF NITROGEN OXIDES FROM GAS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Prior to the cryogenic separation of oxygen and nitrogen from air, various trace air impurities must be removed to avoid formation of solids in heat exchange equipment and resultant high pressure drops in the cryogenic process. The most obvious trace air impurities that must be removed include $CO_2$ and water.

However, many air separation plants are in close proximity to stationary combustion sources or roadways. In these instances, there may be significant quantities (ppm levels) of nitrogen oxides present in the ambient air. These impurities could include; NO, $NO_2$ and $N_2O$. These impurities could further react at low temperature to form other nitrogen oxides, including; $N_2O_3$, $N_2O_4$ and $N_2O_5$. Since these materials form solids at liquid nitrogen temperatures, it is possible that their presence in ambient air could lead to freeze out problems in the cold end of the cryogenic separation plant. Therefore, it is desirable to devise an air pretreatment system which not only removes $CO_2$ and water, but removes nitrogen oxides as well.

The first reference to use of a pressure swing adsorption (PSA) drier is U.S. Pat. No. 2,944,627. Using purge to feed ratios greater than 1.0 on an actual volume of gas basis, it was found that using an alumina adsorbent, the product air was devoid of water, $CO_2$ and oil vapor. No mention of acetylene or nitrogen oxides is made.

German Patent Publication DE 3,045,451 (1981) describes a PSA process which operates at 5–10° C., 880 KPa adsorption pressure and 98 KPa regeneration pressure. Feed air is passed through a layer of 13X particles to remove the bulk of water vapor and $CO_2$ and then through a final layer of alumina for final clean-up. The alumina section can constitute 20–80% of the bed volume. The bed layering is claimed to reduce formation of "cold spots" in the adsorbent beds. Nitrogen oxide removal is not mentioned.

U.S. Pat. No. 4,711,645 describes a PSA process for removal of water and $CO_2$ utilizing alumina for water removal followed by a zeolite for $CO_2$ removal. It is claimed that the use of alumina for water removal allows adsorption at a lower temperature (due to its lower heat of adsorption) which increases the capacity of the zeolite for $CO_2$.

U.S. Pat. No. 4,249,915 describes a PSA process where water and $CO_2$ are removed from atmospheric air by adsorption in two separate beds. The moisture-laden bed is regenerated by PSA in a relatively short operating cycle, while the $CO_2$-laden bed is thermally regenerated at longer time intervals. Removal of nitrogen oxides is not mentioned.

U.S. Pat. No. 5,232,474 teaches a PSA process for pre-purification of air using an initial layer of alumina which comprises 70 to 100% of the bed volume, with the remaining layer, if present, a suitable zeolite. Thus, alumina may be the sole adsorbent present. The benefit of using a solely alumina bed is that it substantially reduces the cold zone that develops in a bed of zeolite during desorption. Since zeolites adsorb significantly more air than alumina, rapid desorption of air from the zeolite results in an acute temperature drop in the bed. The low temperature at which desorption occurs increases the amount of purge gas needed for regeneration. A further benefit of the all alumina bed is less void gas losses, since zeolites adsorb, and hence desorb, more air during blowdown.

E.P. Patent 1 586 961 describes a PSA process for the removal of $CO_2$, water and acetylene from air. Acetylene removal is accomplished with the use of other adsorbents in the bed or further adsorption beds.

EP 0 449 576 A1 teaches using four discrete adsorbent layers, 2 of alumina followed by two more of zeolite, for front-end pre-purification.

There is some limited art which teaches hydrocarbon removal in pre-purification units. For example, DE 37 02 190 A1 discloses the removal of $C_2H_2$, $C_2H_4$ and $C_3H_6$ in addition to $CO_2$ and water.

The prior art has used alumina and other zeolites in layered pretreatment PSA beds upstream of cryogenic air separation. However, the prior art was not aware of instances where nitrogen oxides might exist in elevated levels sufficient to cause process problems in cryogenic air separation where the nitrogen oxides could freeze out and form solids in the process lines which would impair or stop the operation of the process. The present invention has discovered this problem which exists in those areas where nearby combustion sources elevate the nitrogen oxide levels of ambient air and provides a unique solution to the removal of the elevated levels of nitrogen oxides using low energy intensive processing and low capital cost systems, as will be described in greater detail below.

BRIEF SUMMARY OF THE INVENTION

The present invention is a process for the removal of water and carbon dioxide from a gas stream at elevated pressure in a pressure swing adsorption process upstream of a cryogenic processing of the gas stream, the improvement for removing nitrogen oxides from the gas stream containing at least 0.2 ppm by volume of the nitrogen oxides of passing the gas stream through an adsorbent of alumina and then passing the gas stream through a zeolite adsorbent selected from the group consisting of X-zeolite, Y-zeolite, A-zeolite and mixtures thereof to adsorb the nitrogen oxides from the gas stream.

Preferably, the nitrogen oxides are selected from the group consisting of NO, $NO_2$, $N_2O$, $N_2O_3$, $N_2O_4$, $N_2O_5$ and mixtures thereof.

Preferably, the zeolite adsorbent is at least approximately 17% by volume of the total alumina and zeolite adsorbent.

Preferably, the gas stream is air.

Preferably, the cryogenic processing is a cryogenic distillation of air.

Preferably, the pressure swing adsorption process comprises the steps of:

(a) adsorption of said nitrogen oxides at elevated pressure;

(b) countercurrent depressurization;

(c) countercurrent purge with nitrogen oxide depleted gas; and (d) repressurization with nitrogen oxide depleted gas.

More specifically, during step (a) water and carbon dioxide are adsorbed at elevated pressure.

Preferably, the nitrogen oxide depleted gas is from the cryogenic processing.

Preferably, the nitrogen oxide depleted gas is nitrogen from cryogenic distillation of air.

Preferably, the gas stream contains at least 10 ppm by volume of nitrogen oxides.

BRIEF DESCRIPTION OF THE SEVERAL VIEWS OF THE DRAWINGS

Not Applicable

DETAILED DESCRIPTION OF THE INVENTION

The current invention is a process which removes $CO_2$, water and various nitrogen oxides (NO, $NO_2$, $N_2O$, $N_2O_3$, $N_2O_4$, $N_2O_5$ and mixtures thereof) from gases, such as ambient air. The process is a conventional pressure swing adsorption (PSA) process which comprises the following steps: 1) adsorption of impurities at superambient pressure, 2) countercurrent depressurization of the column to near atmospheric pressure, 3) countercurrent purge at near atmospheric pressure with purge gas free of trace impurities and 4) repressurization to feed pressure with product from step 1.

The key aspect of the present invention is use of a zeolite layer at the product end of the PSA bed for nitrogen oxides removal following an initial layer of alumina. The zeolites may be selected from X, Y or A zeolites. Preferably, 13X-zeolite or Na Y-zeolite are used.

Since nitrogen oxides are strongly adsorbed on both alumina and zeolite, it was not apparent whether in a PSA process; 1) alumina alone could effectively remove nitrogen oxides, 2) whether a zeolite layer would effectively desorb nitrogen oxides by mere depressurization in a PSA process without thermal-driven desorption, and 3) whether a zeolite layer would be destroyed by reaction with the nitrogen oxides which are typically acidic components.

Typically, a gas component which is strongly adsorbed by an adsorbent is not readily separated by pressure swing adsorption because in pressure swing adsorption the gas component must not only be adsorbed at elevated pressure adequately, but it must also be readily desorbed at lower pressure. Strongly adsorbed gas components generally do not desorb adequately under the mere influence of a drop in pressure, but more likely require the added driving force of thermal desorption of a thermal swing process (TSA). Thermal swing processing would be unattractive in front end cleanup of feed gas to a cryogenic air separation plant because of the energy requirements to provide the thermal swings and the equipment necessary to provide the heat input.

In a successful pressure swing process, the adsorbent must have a large capacity for the gas component to be adsorbed, but the adsorbent must also have the capacity to desorb the gas component during regeneration, to result in what is known in the adsorption sciences as working capacity. Working capacity is critical to a successful adsorption process because it represents the actual ability of the adsorbent in an actual ongoing process.

The adsorbent must also have selectivity to adsorb the desired gas component and not to co-adsorb gas components not desired to be separated from the feed gas.

The present inventors have surprisingly found that in the unusual circumstances where nitrogen oxide levels are elevated above normal nitrogen oxide levels in a gas mixture, zeolites such as 13X-zeolite, Na Y-zeolite and A-zeolite, can successfully remove nitrogen oxides selectively and with the desired working capacity in a low energy intensive, low capital cost pressure swing adsorption process.

This discovery is particularly significant to the cryogenic separation of air which has historically used alumina and zeolites to remove water and carbon dioxide from feed air to a cryogenic distillation column. Such cryogenic separations have not had to address elevated levels of nitrogen oxides. However, as more cryogenic air separation plants are associated with combustion processes where nitrogen oxides are vented to the ambient air or in industrially concentrated developments, the need to address elevated nitrogen oxide level ambient air is important.

The following examples demonstrate the present invention and its unique ability to remove nitrogen oxides from a gas containing them in a pressure swing adsorption process.

EXAMPLE 1

PSA experiments were carried out in a 1 inch diameter by 6 foot long adsorption vessel. The cycle consisted of the following steps: 1) feed step (11 minutes) at 25° C., 100 psig and 28 liters/min to produce purified air, 2) countercurrent blowdown to 10 psig (0.5 minutes), 3) countercurrent purge with $N_2$ at 10 psig and 15.1 liters/min (10 minutes) and 4) repressurization to 100 psig with $N_2$ (0.5 minutes). The feed gas consisted of air with 10 ppm $NO_2$. Experiments were conducted with 2 different adsorbent configurations. The first set of tests used solely 8×14 mesh activated alumina. The second set of tests used 2.5 feet of activated alumina and 3.5 feet of 1/16 inch diameter UOP 13X-zeolite. The results of steady state PSA testing are shown in the table below in parts per million by volume (ppm): The detector had a detection limit of 10 ppb by volume.

TABLE 1

| Adsorbent | (ppm) $NO_2$@ 1 ft | (ppm) $NO_2$@ 2 ft | (ppm) $NO_2$@ 3 ft | (ppm) $NO_2$@ 4 ft | (ppm) $NO_2$@ 5 ft | (ppm) $NO_2$@ 6 ft |
|---|---|---|---|---|---|---|
| All alumina | 1.5 | 0.55 | 0.45 | 0.25 | 0.19 | 0.13 |
| Alumina/13X | 1.3 | 0.50 | 0 | 0 | 0 | 0 |

The results shown in Table 1 clearly show that the addition of a layer of 13X zeolite at the product end of the PSA bed reduces $NO_2$ breakthrough to zero.

EXAMPLE 2

PSA testing was conducted on a commercial scale PSA (9.5 foot diameter by 10.8 foot long) using solely activated alumina as the adsorbent. The PSA inlet and outlet $NO_x$ ($NO_2$+NO) concentrations were measured at different times of the day. The results of the $NO_x$ testing are given in Table 2. Again, the detection limits were 10 ppb and the values in ppm, all by volume.

TABLE 2

| Measurement number | (ppm) PSA $NO_x$ inlet conc | (ppm) PSA $NO_x$ outlet conc |
|---|---|---|
| 1 | 0.15 | 0 |
| 2 | 0.11 | 0 |
| 3 | 0.21 | 0.03 |
| 4 | 0.43 | 0.11 |
| 5 | 0.75 | 0.38 |

The results given in Table 2 show that at inlet $NO_x$ ($NO+NO_2$) concentrations of less than 0.2 ppm, the PSA, using all activated alumina, effectively removes all the inlet $NO_x$. However, as the inlet concentration of $NO_2+NO$ exceed 0.2 ppm, breakthrough of $NO_x$ is noted. This $NO_x$ can then freeze out in the main heat exchanger of the plant causing unwanted pressure drop and eventual need to defrost the plant.

PSA testing was also conducted on the same plant after removing 17 (vol) % of the alumina from each PSA bed and replacing it with 13X-zeolite. The results of $NO_x$ testing after the addition of 13X-zeolite is given in Table 3. Detection limits were 10 ppb.

TABLE 3

| Measurement number | (ppm) PSA $NO_x$ inlet conc | (ppm) PSA $NO_x$ outlet conc |
|---|---|---|
| 1 | 0.17 | 0 |
| 2 | 0.38 | 0 |
| 3 | 0.29 | 0 |
| 4 | 0.11 | 0 |
| 5 | 0.07 | 0 |

The data given in Table 3 clearly shows that the addition of 1 3X-zeolite improved the $NO_x$ removal capability of the PSA. At inlet concentrations of $NO_x$ over 0.2 ppm, no $NO_x$ is noted in the PSA effluent, in contrast to the all alumina PSA.

EXAMPLE 3

The adsorption of $NO_2$ was measured on both activated alumina and 13X zeolite. The capacity was measured by breakthrough curves with 400 ppm $NO_2$ in air at 20° C. and 1.1 atm total pressure. The results are given in Table 4.

TABLE 4

| Adsorbent | (mmole/g) $NO_2$ capacity |
|---|---|
| Alcan AA-300 alumina | 1.9 |
| UOP 13X-zeolite | 4.6 |

The results of Table 4 show that 13X-zeolite adsorbs $NO_2$ more strongly than activated alumina. Given this high capacity of 13X-zeolite for $NO_2$, it is unobvious that it could be used in a PSA process where the strongly adsorbed $NO_2$ is removed by simple depressurization and ambient pressure purge with $N_2$. In general, strongly adsorbing species must be regenerated thermally.

The prior art has used alumina and zeolites to remove water and carbon dioxide, respectively, from air fed to a cryogenic air separation process. However, the prior art has not realized the problem that nitrogen oxides can create in cryogenic gas processing systems. The present inventors have ascertained the problem for the first time and have surprisingly determined a viable, simple, low cost, low energy intensive solution to the existence of elevated levels of nitrogen oxides in feed gas to a cryogenic process.

The use of pressure swing adsorption with layers of alumina and zeolite to remove not only water and carbon dioxide, but also nitrogen oxides, was unexpected given the strong adsorption of nitrogen oxides on zeolites and the acidic nature of the nitrogen oxides. A nitrogen oxide saturated adsorbent has been found to be adequately regenerated by desorption of the nitrogen oxides under the influence of reduced pressure and low pressure purge gas, such as the nitrogen from the downstream cryogenic separation of air. Typically, such pretreatments can be accomplished in switching parallel beds of alumina and zeolite adsorbent, but it is contemplated that other numbers of beds could be used.

The present invention has been described with regard to a preferred embodiment, but the full scope of the present invention should be ascertained from the claims which follow.

We claim:

1. In a process for the removal of water and carbon dioxide from air at elevated pressure in a pressure swing adsorption process upstream of a cryogenic distillation of said air, the improvement for removing nitric oxide and other nitrogen oxides from said air containing at least 0.2 ppm by volume of said nitrogen oxides of passing said air at superatmospheric pressure through an adsorbent of alumina and then passing said air through a zeolite adsorbent selected from the group consisting of X-zeolite, Y-zeolite, A-zeolite and mixtures thereof to adsorb said nitrogen oxides from said air and subsequently regenerating said adsorbents at reduced pressure by depressurization of said adsorbents to near atmospheric pressure and purging at near atmospheric pressure using a low pressure nitrogen oxide depleted purge gas comprising nitrogen from said cryogenic distillation of air.

2. The process of claim 1 wherein said nitrogen oxides are selected from the group consisting of NO, $NO_2$, $N_2O$, $N_2O_3$, $N_2O_4$, $N_2O_5$ and mixtures thereof.

3. The process of claim 1 wherein said zeolite adsorbent is at least approximately 17% by volume of the total alumina and zeolite adsorbent.

4. The process of claim 1 wherein said pressure swing adsorption process comprises the steps of:
    (a) adsorption of said nitrogen oxides at superatmospheric pressure;
    (b) depressurization countercurrently;
    (c) countercurrent purge with nitrogen oxide depleted gas; and
    (d) repressurization with nitrogen depleted gas.

5. The process of claim 4 wherein during step (a) water and carbon dioxide are adsorbed at superatmospheric pressure.

6. The process of claim 1 wherein said gas stream contains at least 10 ppm by volume of nitrogen oxides.

7. The process of claim 1 wherein said zeolite adsorbent is 13X-zeolite.

8. The process of claim 1 wherein said zeolite adsorbent is Na Y-zeolite.

* * * * *